US012286981B2

(12) United States Patent
Wechsel et al.

(10) Patent No.: US 12,286,981 B2
(45) Date of Patent: Apr. 29, 2025

(54) HYDRAULIC VALVE BANK AND MOBILE HYDRAULIC SYSTEM

(71) Applicant: HAWE Hydraulik SE, Aschheim (DE)

(72) Inventors: Thomas Wechsel, Aschheim (DE); Sascha Rümenap, Aschheim (DE)

(73) Assignee: HAWE Hydraulik SE, Aschheim (DE)

( * ) Notice: Subject to any disclaimer, the term of this patent is extended or adjusted under 35 U.S.C. 154(b) by 0 days.

(21) Appl. No.: 18/748,579

(22) Filed: Jun. 20, 2024

(65) Prior Publication Data

US 2024/0426323 A1 Dec. 26, 2024

(30) Foreign Application Priority Data

Jun. 20, 2023 (DE) ..................... 10 2023 205 767.0

(51) Int. Cl.
*F15B 11/16* (2006.01)

(52) U.S. Cl.
CPC .......... *F15B 11/166* (2013.01); *F15B 11/162* (2013.01); *F15B 11/163* (2013.01); *F15B 2211/30535* (2013.01); *F15B 2211/327* (2013.01); *F15B 2211/329* (2013.01); *F15B 2211/355* (2013.01);
(Continued)

(58) Field of Classification Search
CPC ..... F15B 11/162; F15B 11/163; F15B 11/165; F15B 11/166; F15B 2211/30535
See application file for complete search history.

(56) References Cited

U.S. PATENT DOCUMENTS 6,250,202 B1 * 6/2001 Buttner ................. F15B 20/002 60/399
7,036,308 B2 * 5/2006 Rollmann ................. B66F 9/22 60/468
(Continued)

FOREIGN PATENT DOCUMENTS

CH 700344 B1 8/2010
DE 4324177 A1 * 2/1994 ............ F15B 11/165
(Continued)

OTHER PUBLICATIONS

German Office Action for German Application No. 10 2023 205 767.0 dated Mar. 1, 2024, 5 pages.

*Primary Examiner* — Michael Leslie
(74) *Attorney, Agent, or Firm* — DINSMORE & SHOHL LLP

(57) ABSTRACT

A hydraulic valve bank has at least two valve sections, a connection section, and a pressure channel for pressurizing the valve sections. The pressure channel connects the connection section to each valve section for pressurizing them. Each valve section has a spool, an electrohydraulic pilot control for actuating the spool and an upstream pressure compensator. The valve bank is a load-sensing system and has a load pressure collecting channel for signaling the highest load pressure. A common pilot pressure signal is applied to the electrohydraulic pilot control of each valve section via the connection section. A single pilot control pressure influencing valve changes the common pilot pressure signal, and is connected to the pressure channel to be acted upon in a first switching direction, and to the load pressure collecting channel to be acted upon in a second switching direction. A mobile hydraulic system includes such a hydraulic valve bank.

15 Claims, 3 Drawing Sheets

(52) U.S. Cl.
CPC ... *F15B 2211/6355* (2013.01); *F15B 2211/67* (2013.01); *F15B 2211/7135* (2013.01); *F15B 2211/7142* (2013.01)

(56) References Cited

U.S. PATENT DOCUMENTS

| | | | | |
|---|---|---|---|---|
| 8,661,809 B2 * | 3/2014 | Rub | ...................... | F15B 11/166<br>91/512 |
| 9,874,884 B2 * | 1/2018 | Knapper | .............. | G05D 16/106 |
| 10,962,031 B2 * | 3/2021 | Stoenner | ............... | F15B 11/166 |

FOREIGN PATENT DOCUMENTS

| | | | | |
|---|---|---|---|---|
| EP | 0582859 A1 * | 2/1994 | ............ | F15B 11/165 |
| EP | 2118500 B1 | 12/2012 | | |

* cited by examiner

HYDRAULIC VALVE BANK AND MOBILE HYDRAULIC SYSTEM

CROSS-REFERENCE TO RELATED APPLICATIONS

This application claims priority to German Patent Application No. 10 2023 205 767.0, filed Jun. 20, 2023, which is hereby incorporated by reference in its entirety.

FIELD OF THE INVENTION

The present invention relates to a hydraulic valve bank and a mobile hydraulic system with such a hydraulic valve bank.

BACKGROUND OF THE INVENTION

Such hydraulic valve banks are known from the state of the art. These hydraulic valve banks have several valve sections and a connection section. Pressure can be applied to the valve sections via a pressure channel, in that the pressure channel connects the connection section to each valve section. In general, the valve sections each have a spool, an electrohydraulic pilot control for actuating the spool and an upstream pressure compensator. A common pilot pressure signal can be applied to the respective electrohydraulic pilot control of each valve section via the connection section in order to move the respective spool out of the neutral position in order to control the connected hydraulic consumers (e.g., cylinders or hydraulic motors).

An upstream pressure compensator is a pressure compensator that is disposed upstream of the spool as seen in the direction of flow from the connection section to the spool. Such hydraulic valve banks are thus configured as load-sensing systems and have a load pressure collecting channel for signaling the highest load pressure present in the system. In other words, the highest load pressure in the system is reported to all pressure compensators from all valve sections in order to regulate the total volume requirement of the hydraulic system, in that the valve section with the highest load pressure specifies the pump pressure to be set. The respective pressure compensator compares the load pressure in the corresponding valve section with the pump pressure. A pressure difference between the load pressure of the valve section and the pump pressure is set via a spring element in the pressure compensator. Due to the constant pressure difference, the volume flow depends only on the following throttle cross-section.

Such hydraulic valve banks or hydraulic systems with upstream pressure compensators are used in a wide variety of mobile hydraulic systems, such as forestry cranes, harvesters, feller bunchers or concrete pumps, due to their simple and proven flow control.

However, the disadvantage of these hydraulic systems with upstream pressure compensators is their behavior in the event of an undersupply, i.e., if the maximum flow rate or volume flow of the pump is less than the sum of the quantities required by the connected hydraulic consumers. In the event of such an undersupply, the pressure compensators of the valve sections with the highest load pressures may no longer regulate and open completely. This is because in the event of an undersupply, the valve sections are supplied depending on their load pressure, i.e., those valve sections with the lowest load pressure are supplied first. As a result, the hydraulic consumers with high load pressures are significantly reduced in speed or even come to a standstill.

This control behavior in the event of undersupply can be prevented by downstream pressure compensators, which is also referred to as “flow sharing”. In such flow-sharing hydraulic systems, the pressure compensators are not disposed between the pump or connection section and the spool, but between the spool and the hydraulic consumer. If there is an undersupply in such a hydraulic system with a downstream pressure compensator, the flow rate is reduced proportionally across all the valve sections to be supplied. Individual hydraulic consumers are therefore not undersupplied and there is no standstill. However, the disadvantage of these hydraulic systems with downstream pressure compensators is higher energy consumption and increased heating of the hydraulic fluid. The use of hydraulic systems with downstream pressure compensators is significantly less attractive, particularly in as the case of an undersupply is rather rare.

There is therefore a need to prevent the standstill of individual hydraulic consumers as far as possible, even in hydraulic systems with upstream pressure compensators in a state of undersupply. For this purpose, CH 700 344 B1 proposes a nozzle chain with an additional valve for each valve section. Although this solution overcomes the disadvantages of an upstream pressure compensator in the event of an undersupply, the additional valves, lines and nozzles mean that significantly higher costs for the hydraulic valve bank are to be expected. This also significantly increases the installation effort.

SUMMARY OF THE INVENTION

It is therefore the objective of the present invention to provide a simply constructed hydraulic valve bank with upstream pressure compensators, in which a hydraulic consumer does not come to a standstill even in the event of an undersupply.

This problem is solved by a hydraulic valve bank as disclosed herein. Preferable embodiments are also described.

The hydraulic valve bank according to the invention is characterized in particular compared to the systems and hydraulic valve banks known from the prior art in that the hydraulic valve bank has a single pilot control pressure influencing valve for changing the common pilot pressure signal. According to the invention, the pilot control pressure influencing valve is connected to the pressure channel in order to be acted upon in a first switching direction and is connected to the load pressure collecting channel in order to be acted upon in a second switching direction.

In other words, the single pilot control pressure influencing valve compares the pump pressure and the highest load pressure present in the hydraulic system in order to influence or change the pilot pressure signal common to all valve sections. An individual valve is therefore not required for each valve section, but the pilot control pressure influencing valve adjusts the pilot pressure signal globally for all spools. This is particularly advantageous if the hydraulic valve bank has a sandwich design, such as the applicant’s PSL product. In this way, a standstill in the event of an undersupply can be ruled out even with a large number of valve sections.

Preferably, the pilot control pressure influencing valve is configured so that a “normal” common pilot pressure signal is applied to the electrohydraulic pilot controls of the valve sections in the event of a normal supply from the pump (pump pressure load pressure). If an undersupply situation occurs (pump pressure<load pressure), the pilot pressure signal is adjusted, in particular globally and proportionally reduced. It is therefore particularly advantageous if the pilot control pressure influencing valve is a proportional pilot control pressure influencing valve.

Preferably, the hydraulic valve bank also has a pilot control channel for applying the pilot control pressure signal to the respective electrohydraulic pilot control of each valve section, whereby the pilot control pressure influencing valve connects the pilot control channel to the pressure channel in the first switching direction and relieves the pilot control channel in the second switching direction. Relief is understood here in a known manner to mean a discharge via a return line to the tank. In this way, the pilot pressure signal can be adjusted proportionally depending on the pump pressure and the highest load pressure.

Preferably, a pressure in the pilot control channel acts on the pilot control pressure influencing valve in the second switching direction. An undersupply can also lead to a drop in the pilot pressure signal. To prevent this, it is preferable if the adjusted pilot pressure or the adjusted pilot pressure signal acts on the pilot control pressure influencing valve in addition to the highest load pressure in the system. It is also preferable if a pressure in the return line acts on the pilot control pressure influencing valve in the first switching direction.

It is advantageous here if the effective areas of the individual pressures acting on the pilot control pressure influencing valve are different. The behavior of the pilot control pressure influencing valve can be precisely adjusted by selecting the effective areas or the ratios between the effective areas. As mentioned above, the pressure in the pressure channel, the pressure in the load pressure collecting channel, the pressure in the pilot control channel and the pressure in the return line can act on the pilot control pressure influencing valve.

Preferably, the hydraulic valve bank has at least one additional valve section connected to the pressure channel, an additional pilot pressure valve and an additional pilot control channel. The at least one additional valve section has a spool, an electrohydraulic pilot control for actuating the spool and an upstream pressure compensator. The additional pilot pressure valve connects the additional pilot control channel to the pressure channel so that an additional pilot pressure signal or an additional pilot pressure can be applied to the electrohydraulic pilot control of the additional valve section via the additional pilot control channel. In this context, it is particularly advantageous if the additional pilot pressure valve is a pressure control valve. The at least one additional valve section is therefore supplied with an additional pilot pressure signal independent of the pilot pressure signal via a separate pilot circuit. This additional pilot pressure signal is not influenced by the pilot control pressure influencing valve and is therefore constant, for example at 20 bar, even if there is an undersupply from the pump. This ensures that the at least one additional valve section is prioritized over the other valve sections in the event of an undersupply from the pump. It is particularly advantageous if the pilot control pressure influencing valve is disposed in the connection section. Preferably, the additional pilot pressure valve is disposed in the connection section. As already described above, hydraulic valve banks are usually designed in sandwich construction, so that it is sufficient for the implementation of the present invention to adapt only the connection section. The valve sections of the already known hydraulic valve banks can thus be used without any adaptations.

As an alternative to a direct reduction of the pilot pressure signal, the pilot pressure signal may consist of a first pilot pressure signal and a second pilot pressure signal, with the second pilot pressure signal acting in the opposite direction to the first pilot pressure signal. In other words, the first pilot pressure signal is a conventional pilot pressure signal known from the prior art, but which forms only a part of the total pilot pressure signal in the event of an undersupply. The entire pilot pressure signal in the event of an undersupply by the pump is then additionally composed of the second pilot pressure signal, which has the opposite effect. For example, if the first pilot pressure signal is always 20 bar, the second pilot pressure signal of 5 bar, for example, can reduce the total pilot pressure signal to 15 bar in the event of an undersupply.

In this regard, it is preferable if the hydraulic valve bank has a first pilot control channel for applying the first pilot control pressure signal to the respective electrohydraulic pilot control of each valve section, and that the hydraulic valve bank has a second pilot control channel for applying the second pilot control pressure signal to the respective electrohydraulic pilot control of each valve section. In simple terms, it can thus be achieved that the first pilot pressure signal moves the respective spool from the neutral position in a first switching direction and the second pilot pressure signal simultaneously "pushes back" the respective spool in the direction of the neutral position in the event of an undersupply by the pump.

Preferably, the pilot control pressure influencing valve is a proportional pilot control pressure influencing valve and connects the second pilot control channel to the pressure channel in the second switching direction and relieves the second pilot control channel in the first switching direction. This ensures that the second pilot pressure signal is 0 bar in the event of a normal supply (pump pressure load pressure) and increases proportionally in the event of an undersupply (pump pressure<load pressure).

Preferably, the hydraulic valve bank has a pilot pressure valve, whereby the pilot pressure valve connects the first pilot control channel to the pressure channel. The first pilot pressure signal is thus provided via the pilot pressure valve. Preferably, the pilot pressure valve to be a pressure control valve in order to obtain the desired first pilot pressure signal of e.g., 20 bar.

A damping element is preferably disposed in the second pilot control channel. This prevents unwanted vibrations in the event of an undersupply. It is also preferably if a nozzle is disposed in the load pressure collecting channel upstream of the pilot control pressure influencing valve.

The problem can also be solved using a mobile hydraulic system comprising a hydraulic valve bank as described above.

BRIEF DESCRIPTION OF THE DRAWINGS

The invention is explained in more detail below with reference to the embodiments shown in the figures. The figures show schematically.

DETAILED DESCRIPTION OF THE INVENTION

Figure 1:
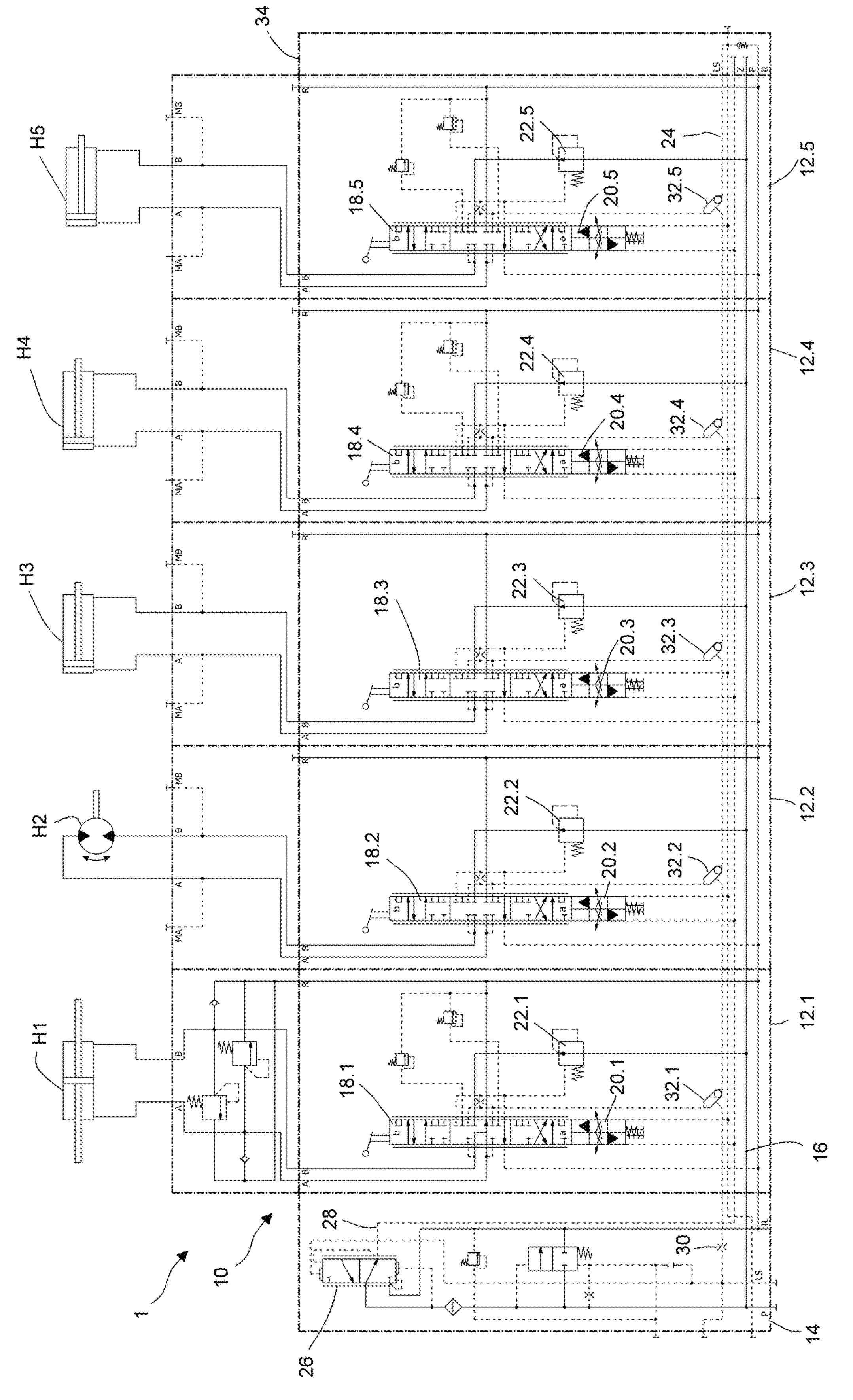
FIG. 1 is a hydraulic circuit diagram of a mobile hydraulic system with a hydraulic valve bank according to a first embodiment.

FIG. 1 shows a hydraulic circuit diagram of a mobile hydraulic system 1 with a hydraulic valve bank 10 according to a first embodiment. In this embodiment, the hydraulic valve bank 10 has a connection section 14, an end plate 34 and a total of five valve sections 12.1-12.5. A hydraulic consumer H.1-H.5 is connected to each valve section 12.1-12.5. As shown, the hydraulic consumers H1-H5 can be provided, for example, as synchronization cylinders, differential cylinders or also as hydraulic motors. The mobile hydraulic system 1 according to this exemplary embodiment can be used, for example, in a forestry work vehicle (not shown).

Each of the valve sections 12.1-12.5 has a proportional spool 18.1-18.5 and a pressure compensator 22.1-22.*n* connected upstream of the spool 18.1-18.5. In order to move the spools 18.1-18.5 from their neutral position shown in FIG. 1 into one of the switching positions a, b, each valve section 12.1-12.5 has an electrohydraulic pilot control 20.1-20.5 known per se. The electrohydraulic pilot controls 20.1-20.5 are all connected to a pilot control channel 28, via which a common pilot control pressure signal is signaled. The pilot pressure signal is described in more detail below. Furthermore, the electrohydraulic pilot controls 20.1-20.5 are relieved in a known manner via a tank line T to the return line R.

To pressurize the hydraulic consumers H1-H5, a pressure channel 16 is provided, which connects the connection section 14 to each of the valve sections 12.1-12.5. Pressure from a pump (not shown) is conventionally distributed to the individual valve sections 12.1-12.5 via the pressure channel 16.

In addition, the hydraulic valve bank 10 has a load pressure collecting channel 24. Via corresponding shuttle valves 31.1-32.5, the highest load pressure of the mobile hydraulic system 1 is reported to the load pressure collecting channel 24 and from there to a pump controller (not shown). Furthermore, the load pressure of the respective valve section 12.1-12.5 is reported to the respective pressure compensator 22.1-22.5 in a known manner in order to achieve an overall load-independent volume flow control for the respective hydraulic consumer H1-H5. Thus, the hydraulic valve bank 10 according to the first embodiment is configured as a load-sensing system in a known manner.

As also shown in FIG. 1, the load pressure collecting channel 24 is relieved together with the tank line T in the end plate 34 to the return line R and further to the tank via a spring-loaded non-return valve disposed there.

In order to prevent a standstill of one or more hydraulic consumers H1-H5 in the event of an undersupply, i.e., if the volume flow of the pump is less than the sum of the quantities requested by the hydraulic consumers H1-H5, the hydraulic valve bank 10 comprises a single or only pilot control pressure influencing valve 26. As shown, the pilot control pressure influencing valve 26 is disposed in the connection section 14. The pressure prevailing in the pressure channel 16 is signaled to the pilot control pressure influencing valve 26 in such a way that this is acted upon in a first switching direction. Furthermore, the pressure prevailing in the load pressure collecting channel 24 is also signaled to the pilot control pressure influencing valve 26 via a nozzle 30, so that this is acted upon in a second switching direction, the second switching direction being opposite to the first switching direction. In addition, the pressure in the pilot control channel 28 is also reported to the pilot control pressure influencing valve 26, whereby this acts in addition to the pressure in the load pressure collecting channel 24 and therefore in the second switching direction. Furthermore, the pressure in the return line R is reported to the pilot control pressure influencing valve 26, whereby this pressure acts in addition to the pressure in the pressure channel 16 and thus in the first switching direction. As shown in FIG. 1, the effective areas of the individual pressures acting on the pilot control pressure influencing valve differ so that the behavior of the pilot control pressure influencing valve 26 can be specifically adjusted by selecting the effective areas.

The pilot control pressure influencing valve 26 is configured as a proportional 3/2-way valve with pressure control function and connects the pilot control channel 28 to the pressure channel 16 on the one hand or to the return line R to the tank on the other hand. Depending on the switching position of the pilot control pressure influencing valve 26, the pilot control channel 28 is thus not relieved at all or at least partially relieved.

With a normal supply from the pump, the pump pressure acting in the first switching direction is greater than the total pressures reported to the pilot control pressure influencing valve 26 and prevailing in the load pressure collecting channel 24 and in the pilot control channel 28, so that the complete pilot pressure reaches the pilot control channel 28 via the pilot control pressure influencing valve 26. This allows the spools 18.1-18.5 to be moved from the neutral position to the desired switching position as requested by the user of the mobile hydraulic system 1. The pilot pressure or the pilot pressure signal can be 20 bar, for example.

In the event of an undersupply by the pump, the pump pressure acting in the first switching direction is lower than the sum of the pressures prevailing in the load pressure collecting channel 24 and in the pilot control channel 28, so that the pilot control channel 28 is relieved in proportion to this ratio. As a result, the pilot pressure signal is reduced and is now only 15 bar, for example. This in turn means that the spools 18.1-18.5 cannot be moved as requested, but at least in those valve sections 12.1-12.5, in which a high load pressure prevails, only a smaller movement of the respective spools 18.1-18.5 from the neutral position is possible. This can prevent one or more of the upstream pressure compensators 22.1-22.5 from opening completely, which would make control impossible.

Figure 2:
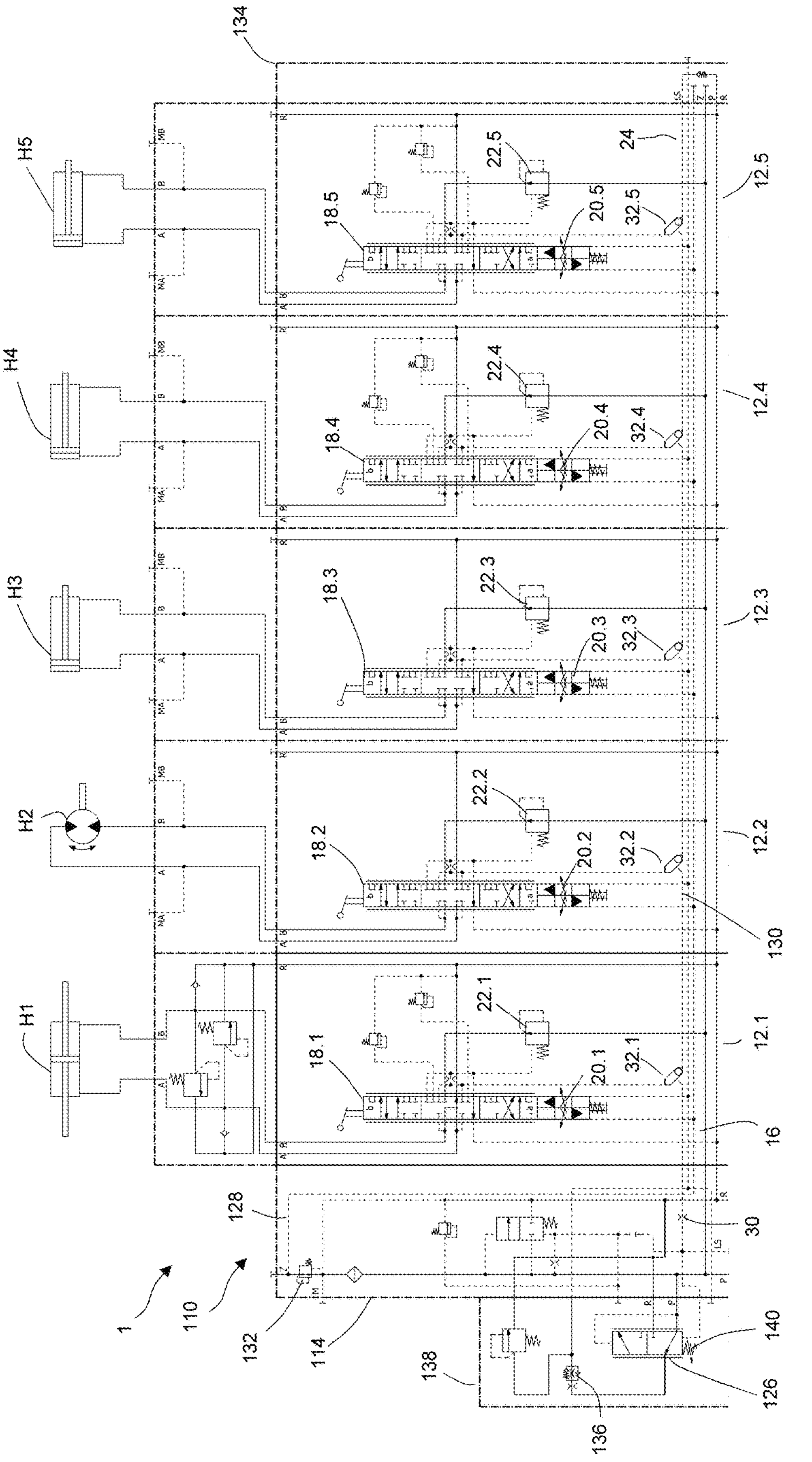
FIG. 2 is a hydraulic circuit diagram of a mobile hydraulic system with a hydraulic valve bank according to a second embodiment.

With reference to FIG. 2, a mobile hydraulic system 1 with a hydraulic valve bank 110 according to a second embodiment is described below. The hydraulic valve bank 110 according to the second embodiment is configured identically to the hydraulic valve bank 10 according to the first embodiment with respect to the valve sections 12.1-12.5. As described above, a hydraulic consumer H1-H5 is connected to each of the valve sections 12.1-12.5, which can be actuated in a known manner via the spools 18.1-18.5.

The hydraulic valve bank 110 according to the second embodiment differs from the hydraulic valve bank 10 according to the first embodiment in the configuration of the connection section 114 and the end plate 134. In addition, the hydraulic valve bank 110 according to the second embodiment has an additional section 138, which in this exemplary embodiment is flange-mounted on the connection section 14. It is, of course, also possible that the additional section 138 is flange-mounted on the end plate 134.

A pilot pressure valve 132 connected to the pressure channel 16 and configured as a pressure control valve is disposed in the connection section 114, which signals a common first pilot pressure signal of, for example, 20 bar via a first pilot control channel 128 to the electrohydraulic pilot controls 20.1-20.5 of the individual valve sections 12.1-12.5.

Furthermore, a single pilot control pressure influencing valve 126 is disposed in the additional section 138. The pressure prevailing in the pressure channel 16 is reported to the pilot control pressure influencing valve 126 in such a way that this is acted upon in a first switching direction. Furthermore, the pressure prevailing in the load pressure collecting channel 24 is also reported to the pilot control pressure influencing valve 126 via a nozzle 30 so that the latter is acted upon in a second switching direction, the second switching direction being opposite to the first switching direction. In addition, the pilot control pressure influencing valve 126 has a biasing element 140 which also biases the pilot control pressure influencing valve 126 in the second switching direction in order to equalize the pressure difference between maximum pump pressure and the maximum load pressure under normal supply. As shown, the biasing element 140 can be configured as an adjustable spring.

In this exemplary embodiment, the pilot control pressure influencing valve 126 is configured as a proportional 3/2-way valve with pressure control function. Depending on the switching position of the pilot control pressure influencing valve 126, a second pilot control channel 130 can be connected either to the pressure channel 16 or to the return line R via the pilot control pressure influencing valve 126. It should be noted here that the second pilot control channel 130 largely corresponds to the tank line T of the hydraulic valve bank 10 according to the first embodiment, so that conventional and already known valve sections 12.1-12.5 can also be used in this embodiment. In contrast to the first embodiment, however, the second pilot control channel 130 is not relieved to the return line R in the end plate 134. Rather, the pressure is relieved to the return line R via the additional section 138 or via the pilot control pressure influencing valve 126 disposed therein.

During a normal supply by the pump, the pump pressure applied to the pilot control pressure influencing valve 126 exceeds the sum of the preload pressure of the preload element 140 applied to the pilot control pressure influencing valve 126 and the highest load pressure in the load pressure collecting channel 24. The pilot control pressure influencing valve 126 thus connects the second pilot control channel 130 completely to the return line R. The electrohydraulic pilot controls 20.1-20.5 are thus relieved via the second pilot control channel 130 and the pilot control pressure influencing valve 126 to the return R. Furthermore, the first pilot pressure signal reported via the pilot pressure valve 132 is present in the first pilot control channel 128, so that the spools 18.1-18.5 can be moved from the neutral position to the desired switching position as requested by the user of the mobile hydraulic system 1.

If the condition of undersupply by the pump occurs, the pump pressure in the pressure channel 16 falls below the sum of the preload pressure of the preload element 140 and the load pressure signaled to the pilot control pressure influencing valve 126. Thus, the second pilot control channel 130 is at least partially connected to the pressure channel 16, whereby a second pilot control pressure signal is present in the second pilot control channel 130. This second pilot pressure signal acts in the opposite direction to the first pilot pressure signal on the electrohydraulic pilot controls 20.1-20.5 and "pushes back" the spools 18.1-18.5 accordingly. In other words, if the first pilot pressure signal is, for example, 20 bar and the second pilot pressure signal is, for example, 5 bar, a total pilot pressure signal of 15 bar is reported to the electrohydraulic pilot controls 20.1-20.5. This in turn means that the spools 18.1-18.5 cannot be moved as requested, but at least in the valve sections 12.1-12.5, in which a high load pressure prevails, only a smaller movement of the respective spools 18.1-18.5 from the neutral position is possible. This can prevent one or more of the upstream pressure compensators 22.1-22.5 from opening completely, which would make control impossible.

In order to prevent pressure peaks in the second pilot control channel 130, a damping element 136, as shown in FIG. 2, can be disposed in the second pilot control channel 130. It is not absolutely necessary for the pilot control pressure influencing valve 126 and the damping element 136 to be disposed in the additional section 138. It would also be possible to integrate these functions directly into the connection section 114 or the end plate 134.

Figure 3:
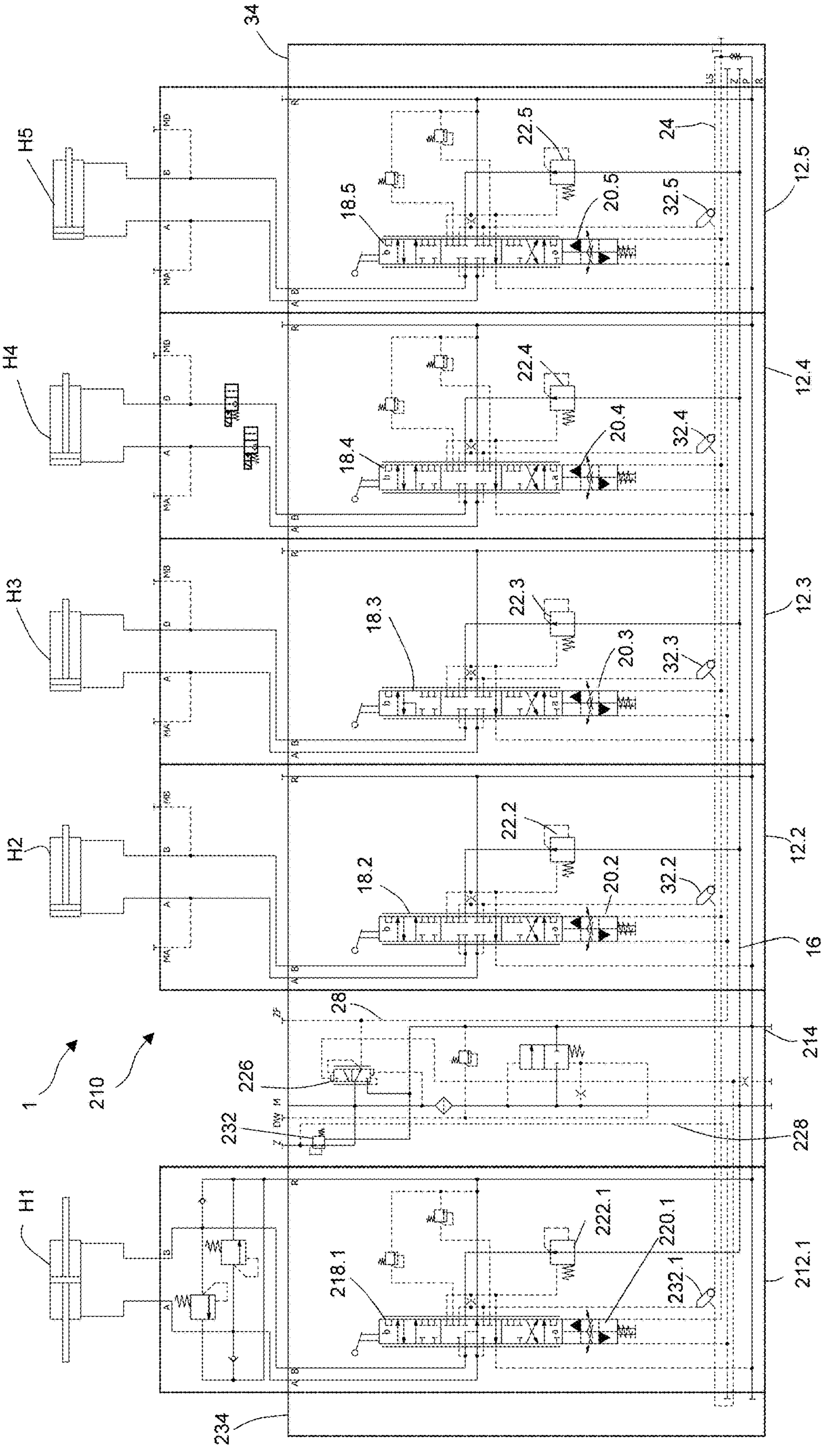
FIG. 3 hydraulic circuit diagram of a mobile hydraulic system with a hydraulic valve bank according to a third embodiment.

With reference to FIG. 3, a mobile hydraulic system 1 with a hydraulic valve bank 210 according to a third embodiment is described below. The hydraulic valve bank 210 according to the third embodiment is configured identically to the hydraulic valve bank 10 according to the first embodiment with respect to the valve sections 12.2-12.5. As described above, a hydraulic consumer H2-H5 is connected to each of the valve sections 12.2-12.5, which can be actuated in a known manner via the spools 18.2-18.5.

The hydraulic valve bank 210 according to the third embodiment differs from the hydraulic valve bank 10 according to the first embodiment on the one hand in the configuration of the connection section 214. On the other hand, the hydraulic valve bank 210 according to the third embodiment has at least one further valve section 212.1. In the exemplary embodiment shown, there is exactly one further valve section 212.1, which is directly adjacent to the connection block 214 and represents an additional valve section 212.1, which is connected to the load pressure collecting channel 24 via shuttle valve 232.1 and has an upstream pressure compensator 222.1. Furthermore, a second end plate 234 is provided. This additional valve section 212.1 will now be discussed in more detail.

The spool 218.1 of the additional valve section 212.1 can be moved from the neutral position in a known manner via an electrohydraulic pilot control 220.1 in order to pressurize or relieve the hydraulic consumer H1 connected to the additional valve section 212.1. However, the electrohydraulic pilot control 220.1 is not pressurized via the pilot pressure signal shared by the pilot control pressure influencing valve 226. Rather, the connection section 214 has an additional pilot pressure valve 232 with a pressure control function. The pressure channel 16 can be connected to an additional pilot control channel 30 via the additional pilot control pressure valve 232, so that a constant additional pilot control pressure signal of, for example, 20 bar can be applied to the electrohydraulic pilot control 220.1 of the additional valve section 212.1. This additional pilot pressure signal is constant and is not influenced by the pilot control pressure influencing valve 226 even in the event of an undersupply by the pump. Thus, the consumer H1 connected to the additional valve section 212.1 can be treated with priority over the other hydraulic consumers of the load-sensing circuit.

The hydraulic consumer H1 connected to the additional valve section 212.1 can, for example, be a steering cylinder.

LIST OF REFERENCE SYMBOLS

1 mobile hydraulic system
10 hydraulic valve bank
12.*n* valve section
14 connection section
16 pressure channel
18.*n* spool
20.*n* electrohydraulic pilot control
22.*n* pressure compensator
24 load pressure collecting channel
26 pilot control pressure influencing valve
28 pilot control channel
30 nozzle
32.*n* shuttle valves
34 end plate
110 hydraulic valve bank
114 connection section
126 pilot control pressure influencing valve
128 first pilot control channel
130 second pilot control channel
132 pilot pressure valve
134 end plate
136 damping element
138 additional section
140 biasing element
210 hydraulic valve bank
214 connection section
212.*n* additional valve section
218.1 spool
220.1 electrohydraulic pilot control
222.1 pressure compensator
226 pilot control pressure influencing valve
228 additional pilot control channel
232 additional pilot pressure valve
234 end plate
a Switching position of the spool
b Switching position of the spool
Hn hydraulic consumer
R return line
T tank line

The invention claimed is:

1. A hydraulic valve bank, comprising:
at least two valve sections each having a spool, an electrohydraulic pilot control for actuating the spool and an upstream pressure compensator;
a connection section, a common pilot pressure signal being applied to the respective electrohydraulic pilot control of each valve section via the connection section; and
a pressure channel for pressurizing the at least two valve sections, the pressure channel connecting the connection section to each valve section for pressurizing the valve sections;
wherein the hydraulic valve bank is configured as a load-sensing system and comprises a load pressure collecting channel for signaling a highest load pressure; and
a single pilot control pressure influencing valve for changing the common pilot pressure signal, the single pilot control pressure influencing valve being connected to the pressure channel to be acted upon in a first switching direction, and the single pilot control pressure influencing valve being connected to the load pressure collecting channel to be acted upon in a second switching direction.

2. The hydraulic valve bank according to claim 1, further comprising:
a pilot control channel for applying the pilot control pressure signal to the respective electrohydraulic pilot control of each valve section;
wherein the single pilot control pressure influencing valve is a proportional pilot control pressure influencing valve and connects the pilot control channel to the pressure channel in the first switching direction and relieves the pilot control channel in the second switching direction.

3. The hydraulic valve bank according to claim 2, wherein a pressure in the pilot control channel acts on the single pilot control pressure influencing valve in the second switching direction.

4. The hydraulic valve bank according to claim 2, further comprising:
at least one additional valve section connected to the pressure channel, the at least one additional valve section having a spool, an electrohydraulic pilot control for actuating the spool and an up-stream pressure compensator;
a pilot pressure valve; and
an additional pilot control channel;
wherein the pilot pressure valve connects the additional pilot control channel to the pressure channel, so that an additional pilot pressure signal can be applied to the electrohydraulic pilot control of the additional valve section via the additional pilot control channel.

5. The hydraulic valve bank according to claim 4, wherein the pilot pressure valve is a pressure control valve.

6. The hydraulic valve bank according to claim 4, wherein the pilot pressure valve is disposed in the connection section.

7. The hydraulic valve bank according to claim 1, wherein the single pilot control pressure influencing valve is disposed in the connection section.

8. The hydraulic valve bank according to claim 1, wherein the pilot pressure signal consists of a first pilot pressure signal and a second pilot pressure signal, with the second pilot pressure signal acting in an opposite direction to the first pilot pressure signal.

9. The hydraulic valve bank according to claim 8, further comprising:
a first pilot control channel for applying the first pilot control pressure signal to the respective electrohydraulic pilot control of each valve section; and
a second pilot control channel for applying the second pilot control pressure signal to the respective electrohydraulic pilot control of each valve section.

10. The hydraulic valve bank according to claim 9, wherein the single pilot control pressure influencing valve is a proportional pilot control pressure influencing valve and connects the second pilot control channel to the pressure channel in the second switching direction and relieves the second pilot control channel in the first switching direction.

11. The hydraulic valve bank according to claim 9, further comprising a pilot pressure valve, wherein the pilot pressure valve connects the first pilot control channel to the pressure channel.

12. The hydraulic valve bank according to claim 11, wherein the pilot pressure valve is a pressure control valve.

13. The hydraulic valve bank according to claim 9, further comprising a damping element disposed in the second pilot control channel.

14. The hydraulic valve bank according to claim 2, further comprising a nozzle disposed in the load pressure collecting channel upstream of the single pilot control pressure influencing valve.

15. A mobile hydraulic system comprising a hydraulic valve bank according to claim 1.

* * * * *